US012011794B2

(12) United States Patent
Bay (10) Patent No.: US 12,011,794 B2
(45) Date of Patent: Jun. 18, 2024

(54) COMPRESSED GAS-OPERATED APPARATUS AND COMPRESSED GAS MACHINING SYSTEM

(71) Applicant: MD DRUCKLUFTTECHNIK GMBH & CO. KG, Renningen (DE)

(72) Inventor: Claus-Werner Bay, Weil der Stadt (DE)

(73) Assignee: MD DRUCKLUFTTECHNIK GMBH & CO. KG, Renningen (DE)

( * ) Notice: Subject to any disclaimer, the term of this patent is extended or adjusted under 35 U.S.C. 154(b) by 874 days.

(21) Appl. No.: 17/074,226

(22) Filed: Oct. 19, 2020

(65) Prior Publication Data

US 2021/0031324 A1 Feb. 4, 2021

Related U.S. Application Data

(63) Continuation of application No. PCT/EP2019/060073, filed on Apr. 18, 2019.

(30) Foreign Application Priority Data

Apr. 20, 2018 (DE) .......................... 102018109573.2

(51) Int. Cl.
*B23Q 17/00* (2006.01)
*B23Q 5/06* (2006.01)
*B23Q 17/22* (2006.01)

(52) U.S. Cl.
CPC .............. *B23Q 17/22* (2013.01); *B23Q 5/06* (2013.01); *B23Q 2717/00* (2013.01)

(58) Field of Classification Search
CPC ... B23Q 5/06; B23Q 5/08; B23Q 3/00; B23Q 3/12; B23Q 1/70; B23Q 11/0017;
(Continued)

(56) References Cited

U.S. PATENT DOCUMENTS 3,753,469 A * 8/1973 Tuttle ...................... B24B 23/00
173/218
4,588,880 A * 5/1986 Hesser ...................... B07C 5/34
340/572.1
(Continued)

FOREIGN PATENT DOCUMENTS

CN 107775023 A * 3/2018
DE 10354474 6/2005
(Continued)

OTHER PUBLICATIONS

CN-107775023-A Machine Translation. (Year: 2023).*
(Continued)

*Primary Examiner* — Nicole N Ramos
(74) *Attorney, Agent, or Firm* — Sheridan Ross P.C.

(57) ABSTRACT

The invention relates to a compressed gas-operated apparatus, which comprises a tool unit and a receiving unit for accommodating the tool unit, wherein the tool unit comprises a stator and a rotor that is rotatingly drivable about a rotational axis relative to the stator while being applied with compressed gas, wherein the tool unit is deflectable relative to the receiving unit from a starting position that is predeterminable by means of the receiving unit into one or more deflection positions. In order to provide a compressed gas-operated apparatus of that type, with which an increased process security can be ensured, it is proposed in accordance with the invention that the apparatus comprises a sensor device for determining a deflection state of the tool unit relative to the receiving unit. The invention also relates to a compressed gas machining system.

22 Claims, 6 Drawing Sheets

(58) Field of Classification Search
CPC ............ B23Q 11/0025; B23Q 2705/04; B23Q 2220/008; B23B 29/00; B23B 29/02; B23B 29/14; B23B 31/00; B23B 31/36; B23B 31/117; B23B 31/1172; B23B 2260/136
See application file for complete search history.

(56) References Cited

U.S. PATENT DOCUMENTS

| | | | | |
|---|---|---|---|---|
| 4,729,436 | A * | 3/1988 | Amador | B23Q 11/04 418/43 |
| 6,840,723 | B2 | 1/2005 | Jacobsson | |
| 6,939,094 | B2 * | 9/2005 | Konishi | B23Q 5/048 409/230 |
| 8,545,146 | B2 * | 10/2013 | Jakob | B23Q 11/04 82/146 |
| 2017/0209974 | A1 * | 7/2017 | Angel | B23Q 17/0971 |
| 2021/0023668 | A1 * | 1/2021 | Nebuka | B23Q 1/70 |

FOREIGN PATENT DOCUMENTS

| | | |
|---|---|---|
| DE | 60121620 | 7/2007 |
| DE | 202007016740 | 3/2008 |
| DE | 202006020273 | 4/2008 |
| DE | 102016115930 | 3/2018 |

OTHER PUBLICATIONS

Official Action for German Patent Application No. 102018109573.2, dated Apr. 16, 2019, 9 pages.
English Translation of the International Search Report for International (PCT) Patent Application No. PCT/EP2019/060073, dated Jul. 18, 2019, 2 pages.
Written Opinion for International (PCT) Patent Application No. PCT/EP2019/060073, dated Jul. 18, 2019, 5 pages.
International Preliminary Report on Patentability for International (PCT) Application No. PCT/EP2019/060073, dated Oct. 29, 2020, 7 pages.

* cited by examiner

COMPRESSED GAS-OPERATED APPARATUS AND COMPRESSED GAS MACHINING SYSTEM

CROSS-REFERENCE TO RELATED APPLICATIONS

This U.S. Non-Provisional Patent Application is a Continuation of International Application No. PCT/EP2019/060073 having an international filing date of 18 Apr. 2019, which designated the United States and claims the benefit of German Patent Application No. 10 2018 109 573.2 filed 20 Apr. 2018, the disclosures of each of which are incorporated herein by reference in their entireties.

FIELD OF THE INVENTION

The present invention relates to a compressed gas-operated apparatus, which comprises a tool unit and a receiving unit for accommodating the tool unit, wherein the tool unit comprises a stator and a rotor that is rotatingly drivable about a rotational axis relative to the stator while being applied with compressed gas, wherein the tool unit is deflectable relative to the receiving unit from a starting position that is predeterminable by means of the receiving unit into one or more deflection positions.

The present invention also relates to a compressed gas machining system, which comprises a compressed gas-operated apparatus and a moveably configured and/or controllable holding device.

BACKGROUND OF THE INVENTION

Various areas of application exist for compressed gas-operated apparatuses, in particular in the field of industrial manufacture and machining of workpieces. It is common to use compressed gas-operated apparatuses to drive a machining tool. Examples of this are grinding, polishing, deburring, or milling tools. Hand-guided compressed gas-operated apparatus as well as the fixing of such apparatuses to a mechanically moveable holding device like, for example, a robotic arm are known. Non-hand-guided compressed gas-operated apparatuses on mechanically moveable holding devices can be arranged in work areas that are not visible or that are not accessible during operation due to constructive reasons or for reasons of work safety. Compressed gas-operated apparatuses stated at the outset have proven themselves in practice due to their deflectability for adapting to component geometries, in particular due to occurring component tolerances, the deflectability of the tool unit in relation to the receiving unit making it possible to compensate for component imprecision during machining.

It would be desirable, however, to be able to also recognize faulty components, wear to a machining tool, and/or an incorrect operation of a compressed gas-operated apparatus.

An object underlying the present invention is therefore to provide a generic compressed gas-operated apparatus and a compressed gas machining system, by means of which an increased process reliability can be ensured.

SUMMARY OF THE INVENTION

In a first aspect of the invention, a compressed gas-operated apparatus comprises a tool unit and a receiving unit for accommodating the tool unit, wherein the tool unit comprises a stator and a rotor that is rotatingly drivable about a rotational axis relative to the stator while being applied with compressed gas, wherein the tool unit is deflectable relative to the receiving unit from a starting position that is predeterminable by means of the receiving unit into one or more deflection positions. The apparatus further comprises a sensor device for determining a deflection state of the tool unit relative to the receiving unit.

In a second aspect of the invention, a compressed gas machining system comprises a compressed gas-operated apparatus in accordance with the first aspect of the invention and a moveably configured and/or controllable holding device, on which the apparatus is preferably held by way of the receiving unit. The holding device is, for example, mechanically moveable, for instance in the form of a robotic arm.

BRIEF DESCRIPTION OF THE DRAWINGS

The foregoing summary and the following description may be better understood in conjunction with the drawing figures, of which.

DETAILED DESCRIPTION OF PREFERRED EMBODIMENTS OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a compressed gas-operated apparatus, which comprises a tool unit and a receiving unit for accommodating the tool unit, wherein the tool unit comprises a stator and a rotor that is rotatingly drivable about a rotational axis relative to the stator while being applied with compressed gas, wherein the tool unit is deflectable relative to the receiving unit from a starting position that is predeterminable by means of the receiving unit into one or more deflection positions. The apparatus further comprises a sensor device for determining a deflection state of the tool unit relative to the receiving unit.

In the compressed gas-operated apparatus in accordance with the invention, it can be determined by means of the sensor device whether and preferably how far the tool unit is deflected relative to the starting position in relation to the receiving unit. This makes it possible in a handling-friendly and reliable manner to obtain further information regarding the operating state, in particular regarding the deflection state, of the compressed gas-operated apparatus. A determination of the deflection state of the tool unit relative to the receiving unit is advantageous in particular when the compressed gas-operated apparatus is guided along a component contour by an operator, a so-called "integrator", during so-called "teaching", and/or when the compressed gas-operated apparatus, while being used within the scope of intended use, is guided by means of a mechanically moveable holding device like e.g. a robotic arm. By providing the sensor unit, a present component quality, a degree of wear to a machining tool, and/or incorrect operation can be inferred e.g. on the basis of the determined deflection state. For example, poor component quality, a worn machining tool (for example chatter marks produced by the worn machining tool on a component surface) and/or an incorrect operation, in particular by applying excessive force, may lead to unacceptable deflection states of the tool unit relative to the receiving unit.

In particular compressed air can be used as the compressed gas for the apparatus. The compressed gas-operated apparatus therefore is or forms, in particular, a compressed air spindle.

The receiving unit preferably forms at least a portion of a housing of the apparatus.

Fixed or fixable to the rotor of the tool unit is, in particular, a machining tool for driving the same, for example a milling tool, a deburring tool, or a grinding tool, in particular on a connecting portion of the rotor.

The rotor and the stator preferably together form in a manner known per se a compressed gas motor, which comprises drive elements, configured e.g. as vanes. Instead of a configuration of the compressed gas motor as a vane motor, a configuration as a turbine motor is also conceivable.

Preferably, deflection state data regarding a deflection state of the tool unit relative to the receiving unit are providable by means of the sensor device.

In an advantageous embodiment of the compressed gas-operated apparatus, provision is made for the apparatus to comprise one or more pistons, which are guided in the receiving unit so as to be moveable along a guide direction and are configured to be applied with compressed gas.

The one or more pistons are thereby, in particular, fixed to the tool unit.

The compressed gas-operated apparatus preferably comprises three or more than three, preferably at least five, pistons, which are guided in the receiving unit of the apparatus so as to be moveable along the guide direction and are configured to be applied with compressed gas, and which are preferably arranged in a circle perpendicularly to the guide direction. A particularly uniform distribution of the occurring forces can preferably thus be achieved. In particular, a canting of the tool unit can be prevented.

It may be favorable if the rotational axis of the tool unit in the starting position of the tool unit is arranged in parallel to the guide direction of the one or more pistons.

It is advantageous if a deflection position and/or a deflection direction of the tool unit relative to the receiving unit is determinable by means of the sensor device.

Preferably, deflection position data regarding a deflection position and/or deflection direction data regarding a deflection direction of the tool unit relative to the receiving unit are providable by means of the sensor device. The deflection position comprises, in particular, an amount and/or a degree for the deflection of the tool unit relative to the receiving unit in relation to the starting position.

It proves to be advantageous if the sensor device comprises one or more sensor elements and one or more active elements, wherein one or more active elements or one or more sensor elements are preferably arranged on a side of the tool unit remote from the rotor for determining a deflection position and/or deflection direction of the tool unit. The active elements are preferably configured as magnetic elements, in particular a permanent magnet elements.

One or more sensor elements are thereby arranged, in particular, outside of a region of the apparatus that is applied with compressed gas.

The sensor device favorably comprises one or more sensor elements, in addition to the sensor elements arranged on the side of the tool unit remote from the rotor, for determining an axial deflection of the tool unit relative to the receiving unit. Alternatively or in addition thereto, the axial deflection of the tool unit relative to the receiving unit is determinable by means of the sensor elements, which are arranged on the side of the tool unit remote from the rotor, such that additional sensor elements can be omitted.

In an advantageous embodiment of the compressed gas-operated apparatus, provision is made for one or more active elements to be arranged on the side of the tool unit remote from the rotor and for one or more sensor elements to be arranged on the receiving unit.

Alternatively thereto, it is conceivable for one or more sensor elements to be arranged on the side of the tool unit remote from the rotor and for one or more active elements to be arranged on the receiving unit.

In order to be able to achieve a simple mountability of the compressed gas-operated apparatus, it proves to be advantageous if the sensor elements and/or the active elements are each arranged on a common support part.

The active elements are preferably arranged on a flange portion on a side of the tool unit remote from the rotor, said flange portion forming the common support part. The flange portion projects preferably radially, in particular perpendicularly, away from the stator and in particular is fixed thereto.

In an advantageous embodiment of the compressed gas-operated apparatus, provision is made for sensor elements of the sensor device to be arranged on a printed circuit board (PCB).

The printed circuit board preferably forms a support part for at least one sensor element. If a plurality of sensor elements are provided, the printed circuit board forms, in particular, a common support part for the sensor elements. In particular, the printed circuit board forms a carrier board. The printed circuit board is preferably arranged in the receiving unit, in particular on or in a covering part thereof.

It is further advantageous if the sensor device comprises one or more sensor elements for determining a position of one or more pistons, in particular for determining a deflection position and/or a deflection direction of the tool unit relative to the receiving unit.

The determination of the position of the one or more pistons comprises, in particular, a determination of a position of the one or more pistons along the guide direction. A deflection position and/or deflection direction of the tool unit can preferably be inferred through the determination of the position of the one or more pistons, which are fixed, in particular, to the tool unit. The sensor device hereby preferably comprises one or more sensor elements and one or more active elements, wherein the active elements are arranged, in particular, on a face side of the pistons remote from the rotor. One or more sensor elements are thereby arranged, in particular, in a region of the apparatus that is applied with compressed gas, in particular on the receiving unit. One or more sensor units comprising respective sensor elements are thereby preferably screwable into the receiving unit.

In one embodiment of the compressed air-operated apparatus, provision is made for a rotational speed of the rotor relative to the stator to be determinable by means of the sensor device.

The rotor preferably comprises a shaft defining the rotational axis, which is rotatably mounted on the stator by way of bearing elements, wherein a rotational speed of the shaft relative to the stator and/or relative to the receiving unit is determinable by means of the sensor device.

Rotational speed data are hereby preferably providable by means of the sensor device.

It may be favorable if a rotational speed monitoring with regard to a process control can be enabled by means of the sensor device. For example, when a rotational speed of the rotor in relation to the stator falls, wear to a machining tool arranged on the compressed gas-operated apparatus can be inferred, for example on the basis of increasing pressure forces due to the worn machining tool. Should it be necessary, countermeasures can be initiated, for example in the case of a decrease in rotational speed due to the pressure of the compressed gas being too low or due to insufficient lubrication.

The operator can preferably be informed of the decrease in rotational speed by means of an indicating device.

The sensor device comprises, in particular, an active element arranged on the shaft. The active element is preferably a magnet, in particular a permanent magnet. The sensor device preferably comprises a sensor element for detecting the rotational state of the shaft. The sensor element is preferably arranged radially next to the active element in relation to the rotational axis. Alternatively or in addition thereto, the sensor element is arranged on the aforementioned common support part, in particular on the printed circuit board.

It proves to be further advantageous if a deflection state of the tool unit relative to the receiving unit is discretely or continuously determinable by means of the sensor device.

The compressed gas-operated apparatus favorably comprises a storage device for storing a deflection state determined by the sensor device and/or a rotational speed determined by the sensor device.

The sensor device preferably comprises the storage device. The sensor device is arranged in particular together with the storage device on the printed circuit board, in particular on the support part for the at least one sensor element.

The storage device is preferably configured to store deflection state data, in particular deflection position data and/or deflection direction data, and/or to store rotational speed data. The deflection state data and the rotational speed data are, in particular, sensor data.

The storage device is preferably configured to continuously or discretely store the deflection state data and/or rotational speed data. A time interval for the discrete determination and/or storage is preferably predeterminable by an operator.

The sensor device and/or the storage device is favorably configured as an integrated circuit. The data are in particular readable from the storage device by means of a data interface of the compressed gas-operated apparatus.

A time stamp for the respective sensor data is preferably storable in the storage device. A time profile of the sensor data can thus preferably be logged. Alternatively or in addition thereto, an operating time or a runtime, in particular a total runtime, of the compressed gas-operated apparatus is storable in the storage device.

It may be favorable if deflection states and/or rotational speeds determined by the sensor device that exceed a predetermined threshold value and/or are below a predetermined threshold value are storable by means of the storage device. Thus preferably a rotational speed of the rotor relative to the stator can be stored, which rotational speed is below a predetermined threshold value, for example due to a worn tool, too low of a pressure of the compressed gas or due to insufficient lubrication.

The stored data, which in particular comprise deflection state data, rotational speed data, and/or runtime data, are preferably readable from the storage device for later evaluation or troubleshooting. The stored data are favorably used for service purposes and/or quality control.

The at least one threshold value is preferably predeterminable by an operator.

Alternatively or in addition thereto, a continuous storage of deflection states and/or rotational speeds by means of the storage device is conceivable. The storage device hereby comprises, in particular, a digital circular buffer.

In one embodiment of the compressed gas-operated apparatus, provision is made for the apparatus to comprise a data interface for the data transmission to an indicating device of deflection state data of a deflection state of the tool unit relative to the receiving unit determined by the sensor device.

The compressed gas-operated apparatus preferably comprises an indicating device, in particular an optical indicating device, for example in the form of one or more light-emitting diodes (LED). The indicating device is preferably arranged within the receiving unit and/or in a covering part arranged on the receiving unit.

The data interface is hereby configured, in particular, for the data transmission of deflection position data and/or deflection direction data. The data interface is preferably also configured for the data transmission of rotational speed data. The data interface is preferably configured for the wired and/or wireless transmission of data and preferably is arranged on the printed circuit board, in particular on the carrier board.

The indicating device is preferably configured to optically and/or acoustically inform an operator about a deflection state, in particular to optically and/or acoustically inform an operator when said deflection state exceeds a predetermined threshold value and/or is below a predetermined threshold value. The indicating device hereby comprises, in particular, a display device, for example a screen of a personal computer (PC), a smartphone, or a tablet computer. For example, the indicating device comprises one or more light-emitting diodes (LED).

The tool unit is preferably deflectable from the starting position into the one or more deflection positions counter to a force of a restoring device.

The restoring device preferably comprises one or more pistons configured to be applied with compressed gas. The tool unit is, in particular, deflectable from the starting position into the one or more deflection positions counter to the force of one or more pistons applied with compressed gas.

Alternatively or in addition to the pistons configured to be applied with compressed gas, the restoring device comprises, in particular, one or more spring elements, for example coil springs or plate springs.

The tool unit is preferably thereby moveable into the starting position by applying the one or more pistons with compressed gas.

The tool unit in the starting position is favorably arranged in parallel, in particular coaxially, to a longitudinal axis of the receiving unit.

It is conceivable for the tool unit in one or more deflection positions to be tilted relative to a longitudinal axis of the receiving unit and/or to be displaced relative to the receiving unit axially in the direction of the longitudinal axis of the receiving unit.

The tool unit is favorably tiltable relative to the longitudinal axis of the receiving unit by an angle of at least about 2°. The tool unit is typically tiltable relative to the longitudinal axis of the receiving unit by an angle of 3° to 5°. It may thereby be further favorable if the tool unit is displaceable axially relative to the receiving unit by at least 0.5 mm.

It is thereby advantageous if the tool unit is moveable, in particular in the shape of a conical surface, relative to the longitudinal axis of the receiving unit in at least one plane, preferably in at least two planes, in particular arranged perpendicularly to each other.

A rotational axis of the tool unit is thereby preferably moveable on a conical surface.

The sensor device is favorably configured as an inductive, capacitive, optical, and/or magnetic sensor device.

The sensor device preferably thereby comprises one or more magnetic field sensor elements, preferably Hall sensor elements, in particular 3D Hall sensor elements.

A deflection direction and/or a deflection position of the tool unit relative to the receiving unit is preferably determinably by means of a 3D Hall sensor element. In particular, a rotational speed of the rotor relative to the stator is also determinable by means of a 3D Hall sensor element.

The present invention further relates to a compressed gas machining system, comprising a compressed gas-operated apparatus of the aforementioned type and a moveably configured and/or controllable holding device, on which the apparatus is preferably held by way of the receiving unit. The holding device is, for example, mechanically moveable, for instance in the form of a robotic arm.

An advantageous embodiment of the compressed gas machining system may comprise a control device, by means of which the holding device is controllable in an automated manner and/or by means of which the holding device is controllable by an operator. The compressed gas-operated apparatus is thus favorably positionable on a workpiece in an automated manner by means of the holding device, for example in dependence on a data set that describes a geometry and/or position of the workpiece. The compressed gas machining system comprises, in particular, an operating unit, by means of which the holding device is controllable during "teaching" by an operator or "integrator".

The holding device is favorably controllable in dependence on the deflection state determined by the sensor device of the compressed gas-operated apparatus, in particular for controlling and/or regulating a position of the compressed gas-operated apparatus in the machining of a workpiece. The control device of the compressed gas machining system is preferably configured to communicate with a data interface of the compressed gas-operated apparatus. In particular, deflection state data and/or rotational speed data are transmittable from the compressed gas-operated apparatus to the control device of the compressed gas machining system.

An advantageous embodiment of the compressed gas machining system may comprise an optical and/or acoustic indicating device, by means of which it can be indicated to an operator when the deflection state and/or a rotational speed of the rotor relative to the stator exceeds a predetermined threshold value and/or is below a predetermined threshold value.

The indicating device preferably comprises a display device. The display device comprises e.g. a screen of a personal computer (PC), a smartphone, or a tablet computer. Alternatively or in addition thereto, the indicating device comprises one or more light-emitting diodes (LED).

Preferably, different deflection states are displayable with different colors by means of one or more light-emitting diodes (LED), for example green (within a desired range), yellow (at the edge of the desired range) and red (outside the desired range).

A control and/or regulation of a compressed gas application to the pistons is preferably possible by means of the deflection states determined by the sensor device of the compressed gas-operated apparatus, such that a restoring force of the pistons is controllable and/or regulatable in dependence on a determined deflection state of the tool unit relative to the receiving unit.

It proves to be further advantageous if the compressed gas processing system comprises a compressed gas provisioning device coupled to the sensor device of the apparatus, by means of which the amount and/or the pressure of compressed gas can be set in dependence on a rotational state determined by means of the sensor device. A control and/or regulation of the amount (the volume flow) and/or the pressure of compressed gas is preferably possible. The operating point of the compressed gas-operated apparatus can be set ideally in dependence on the respectively detected rotational state and preferably the rotational speed.

Figure 1:
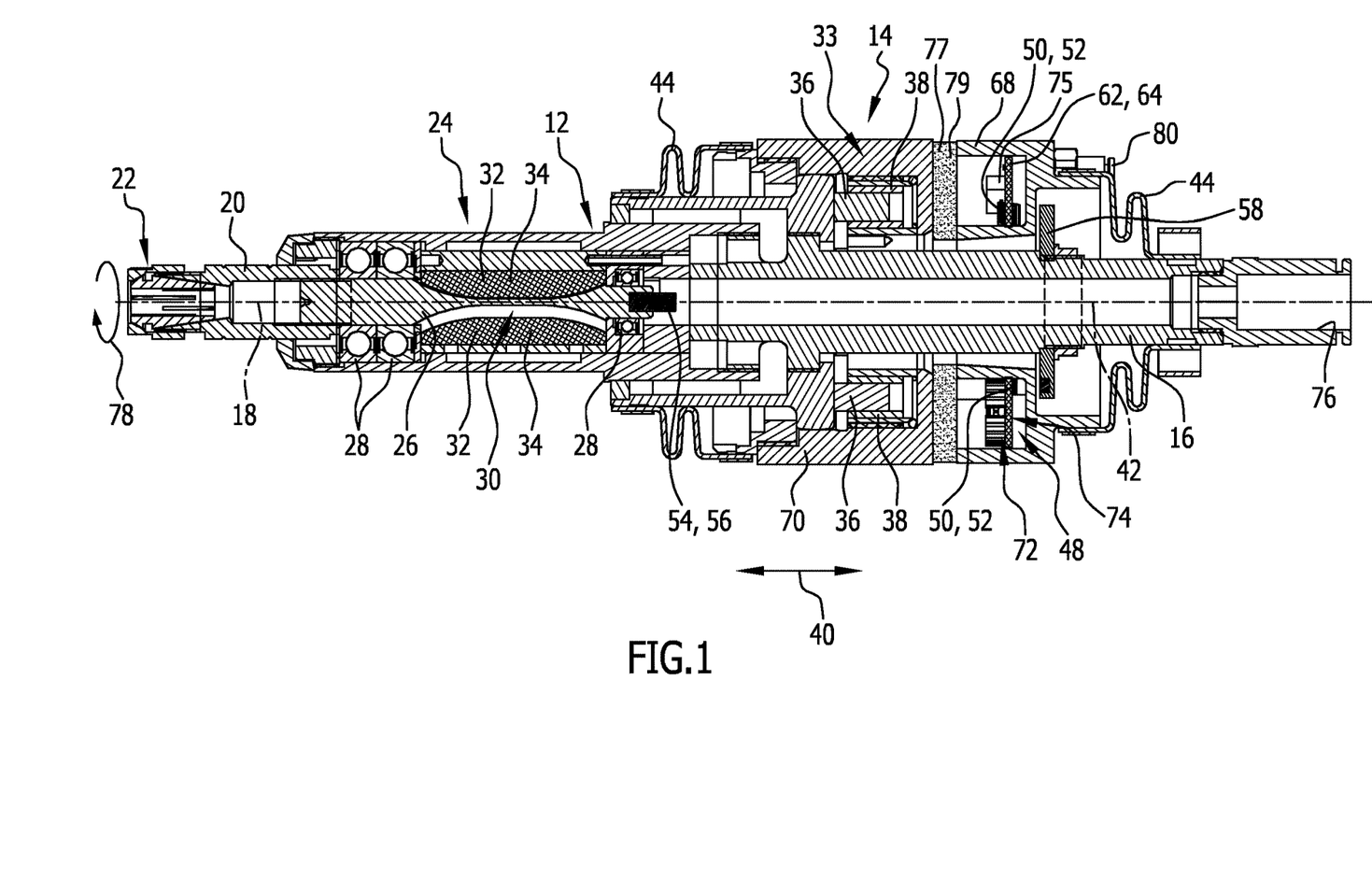
FIG. 1: shows a longitudinal sectional view of a preferred embodiment of a compressed gas-operated apparatus in accordance with the invention in a starting position.
Figure 2:
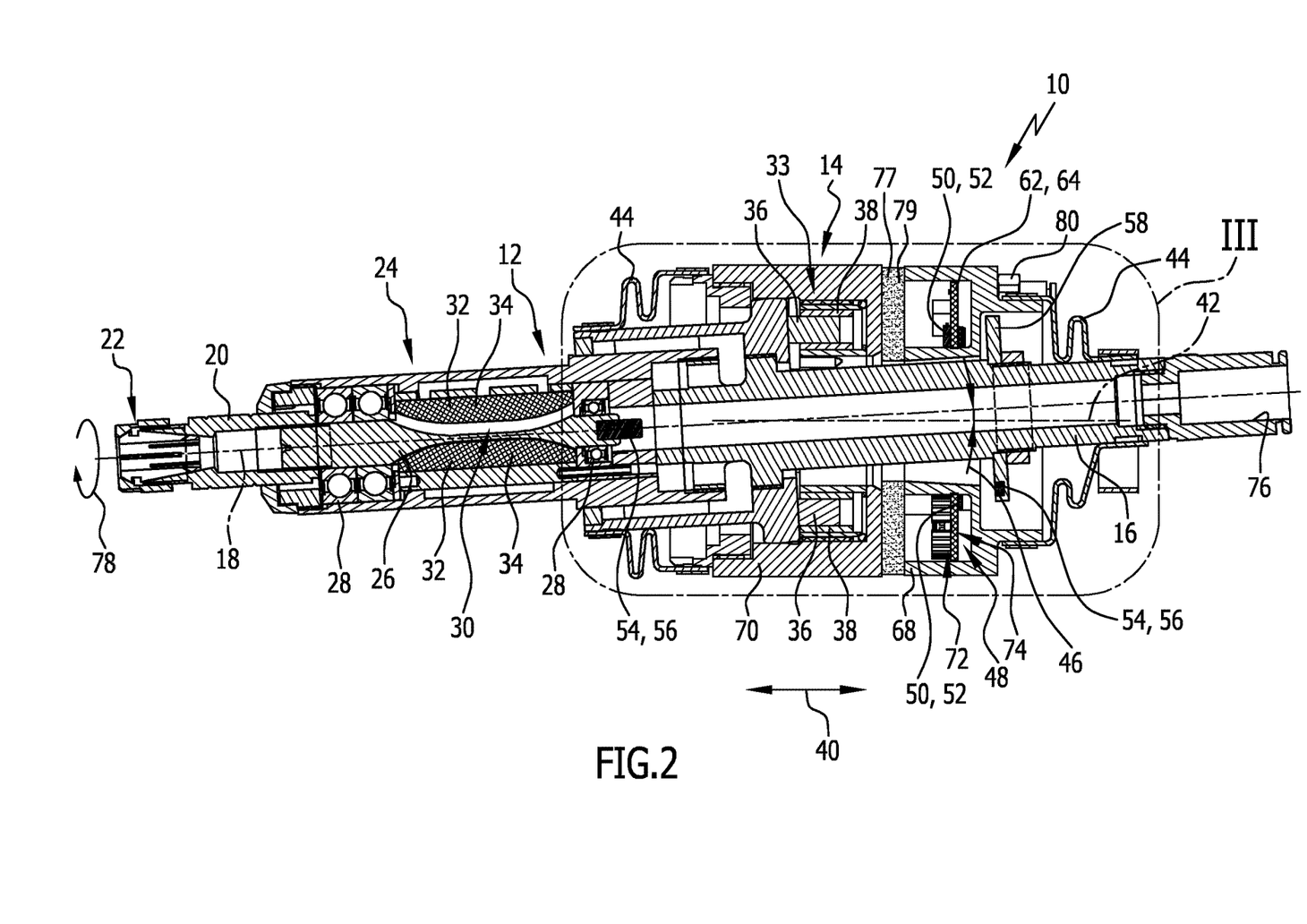
FIG. 2: shows a longitudinal sectional view of the apparatus from FIG. 1 in a deflection position.
Figure 3:
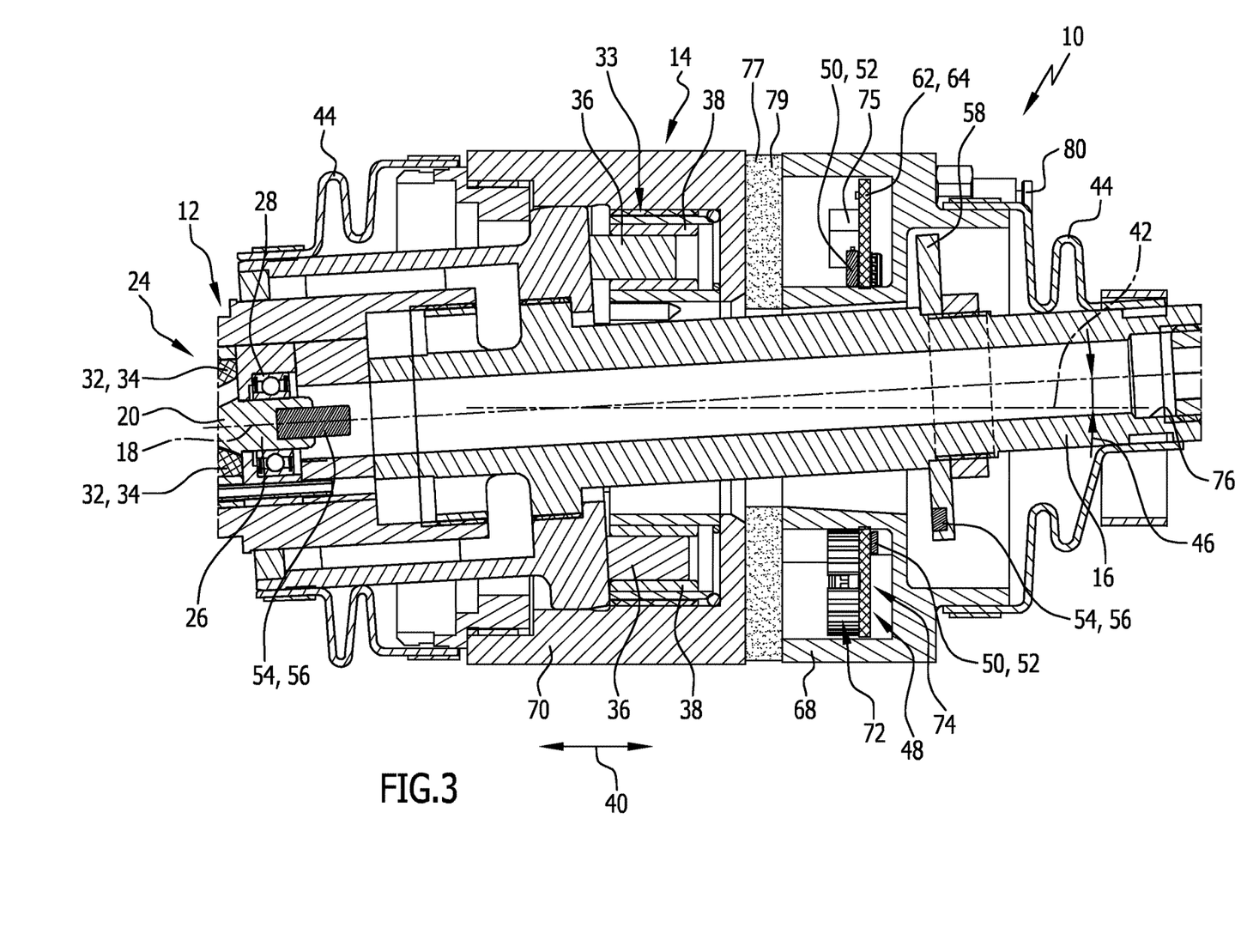
FIG. 3: shows an enlarged depiction of detail III in FIG. 2.

FIGS. 1 to 3 show in a longitudinal sectional view a preferred embodiment, designated with the reference numeral 10, of a compressed gas-operated apparatus in accordance with the invention. The apparatus 10 may be used in industrial manufacture for machining an object. For this purpose, a machining tool, not depicted in FIGS. 1 to 3, may be fixable or fixed to the apparatus 10, said machining tool being rotatingly drivable by the apparatus 10 and serving to machine the object. Such a use of the apparatus 10 is described in the following with reference to FIG. 6 and an advantageous embodiment of a compressed gas machining system in accordance with the invention.

The compressed gas-operated apparatus 10 comprises a tool unit 12 and a receiving unit 14 for accommodating the tool unit 12.

The tool unit 12 comprises a stator 16 and a rotor 20 that is rotatingly drivable about a rotational axis 18 relative to the stator 16 while being applied with compressed gas. The rotor 20 of the tool unit 12 comprises, in particular, a connecting portion 22 to which a machining tool is fixable, for example by means of force- and/or positive-locking, for example by screwing, clamping, or latching.

The rotor 20 and the stator 16 together form a compressed gas motor 24. The rotor 20 comprises a shaft 26 defining the rotational axis 18, said shaft 26 being rotatably mounted on the stator 16 in a manner known per se by way of bearing elements 28.

The stator 16 delimits a drive space 30 between the bearing elements 28 spaced axially at a distance from each other. The rotor 20 comprises drive elements 32 positioned in the drive space 30 and coupled to the shaft 26, which are presently configured as vanes 34. In a manner known per se, the vanes 34 can be applied with compressed gas in the drive space 30, such that a force acting in the circumferential direction of the rotational axis 18 acts on the drive elements 32, which is transmitted to the shaft 26 for rotating the rotor 20.

The tool unit 12 is deflectable, relative to the receiving unit 14, from a starting position depicted in FIG. 1 by means of the receiving unit 14 into one or more deflection positions (cf. FIGS. 2 and 3).

The compressed gas-operated apparatus 10 preferably comprises a restoring device 33, by means of which the tool unit 12 is moveable from the one or more deflection positions back into the starting position.

The tool unit 12 is, in particular, deflectable from the starting position into the one or more deflection positions counter to a force of the restoring device 33.

For this purpose, the compressed gas-operated apparatus 10, in particular the restoring device 33, comprises a plurality of pistons 36, which are movably guided in the receiving unit 14 and are configured to be applied with compressed gas. The pistons 36 are, in particular, each moveably guided in a guide sleeve 38 fixed in the receiving unit 14. The pistons 36 are, for example, fixed at one end to the tool unit 12, in particular to the stator 16. The apparatus 10 preferably comprises three or more than three, preferably at least five, pistons 36, which are guided in the receiving unit 14 so as to be moveable along a guide direction (cf. double arrow 40) and are configured to be applied with compressed gas. The pistons 36 are preferably arranged in a circle perpendicularly to the guide direction 40, wherein a particularly uniform distribution of the occurring forces and a jamming of the pistons 36 can preferably be prevented.

In the starting position of the tool unit 12 depicted in FIG. 1, the rotational axis 18 of the tool unit 12 is arranged in parallel to the guide direction 40 of the pistons 36. In the starting position of the tool unit 12, the rotational axis 18 is arranged, in particular, coaxially to a longitudinal axis 42 of the receiving unit 14. The tool unit 12 is tiltable relative to the longitudinal axis 42 of the receiving unit 14 and/or is axially displaceable relative to the receiving unit 14 in the direction of the longitudinal axis 42 of the receiving unit 14. The compressed gas-operated apparatus 10 therefore preferably comprises two bellows 44 made of a flexible material for sealing between the tool unit 12 and the receiving unit 14. The tool unit 12 is preferably tiltable relative to the longitudinal axis 42 of the receiving unit 14 by an angle 46 of at least 2° (cf. FIGS. 2 and 3). The tool unit 12 is typically tiltable relative to the longitudinal axis 42 of the receiving unit 14 by an angle of 3° to 5°. Further, the tool unit 12 is axially displaceable in the direction of the longitudinal axis 42 of the receiving unit 14 by at least 0.5 mm.

The tool unit 12 is deflectable from the starting position shown in FIG. 1 into one or more deflection positions counter to a force of the pistons 36 applied with compressed gas (cf. FIGS. 2 and 3). By applying the pistons 36 with compressed gas, the tool unit 12 is again moveable into the starting position shown in FIG. 1.

In the embodiment of the compressed gas-operated apparatus 10 shown in FIGS. 1 to 3, the pistons 36 are guided, in particular axially, in parallel to the longitudinal axis 42 of the receiving unit 14.

For determining a deflection state of the tool unit 12 relative to the receiving unit 14, i.e. for determining a deflection position and/or a deflection direction of the tool unit 12 relative to the receiving unit 14, and/or for determining a rotational speed of the rotor 20 relative to the stator 16 or relative to the receiving unit 14, the compressed gas-operated apparatus 10 comprises a sensor device 48. The sensor device 48 is configured e.g. as a magnetic, inductive, capacitive, and/or optical sensor device.

The sensor device 48 of the embodiment of the compressed gas-operated apparatus 10 depicted in FIGS. 1 to 3 comprises, in particular, one or more sensor elements 50, which are configured, in particular, as 3D Hall sensor elements 52.

It is also conceivable for the pistons 36 of the restoring device 33 to be guided perpendicularly to the longitudinal axis 42 (in the radial direction) of the receiving unit 14. Pistons 36 guided in that manner may be arranged e.g. as a unit on a front side of the tool unit 12, in particular on the rotor 20 and, for example, on a side adjacent to the connecting portion 22. In this way, the apparatus can be constructed with a relatively small axial extent.

It is desirable, however, to arrange the pistons 36 at a comparatively large distance from the connecting portion 22 of the rotor 20, and to arrange the sensor device 48 for determining the deflection state of the tool unit 12 relative to the receiving unit 14 also on a side remote from the connecting portion 22, if possible. The accuracy in determining the deflection state by means of the sensor device 48 can be thereby preferably be increased by the resulting leverage.

It has therefore proven to be favorable for the stator 16 to be relatively long.

In one implementation of the compressed gas-operated apparatus 10 in practice, a deflection of the tool unit 12 in the range of about 0.1 mm to about 0.2 mm at the connecting portion 22 can be determined by means of the sensor device 48. This results in a high detectable resolution of the tilt angle in the region of the sensor device 48 in the compressed gas-operated apparatus 10 of about 0.04°.

Further, by means of the sensor device 48, a rotational speed of the rotor 20 relative to the stator 16 is preferably determinable, in particular a rotational speed of the shaft 26 relative to the stator 16 and/or to the receiving unit 14. For this purpose, the sensor device 48 comprises, in particular, an active element 54 arranged on the shaft 26, which is configured, in particular, as a permanent magnet 56. The active element 54 is arranged on an end of the shaft 26 remote from the connecting portion 22. The permanent magnet 56 arranged on the shaft 26 is, in particular, diametrically magnetized, such that a rotational speed of the rotor 20 relative to the stator 16 is determinable by means of the sensor device 48.

The sensor device 48 further comprises active elements 54 configured as permanent magnets 56, which are arranged on a flange portion 58 that is fixed to the stator 16 and projects away therefrom, preferably radially, in particular perpendicularly, in relation to the rotational axis 18. The flange portion 58 forms a common support part 60 for the active elements 54. The permanent magnets 56 fixed to the stator 16 are preferably axially magnetized.

The sensor elements 50 of the sensor device 48 are arranged on a printed circuit board 62, which is configured as a carrier board 64 for the sensor elements 50 and thus forms a common support part for the sensor elements 50. The printed circuit board 62 is arranged, in particular, on a side of the compressed gas-operated apparatus 10 remote from the receiving portion 22.

In the embodiment of the compressed gas-operated apparatus 10 depicted in FIGS. 1 to 3, the sensor elements 50 are arranged outside of a region of the apparatus 10 applied with pressure.

The printed circuit board 62 or the common support part is fixed, in particular, in a covering part 68 of the receiving unit 14. The covering part 68 is connectable, for example, to a base part 70 of the receiving unit 14, for example by screwing the covering part 68 onto the base part 70. The covering part 68 is preferably made of a non-magnetic material, for example of a plastics material.

In an advantageous embodiment of the invention, for example four sensor elements 50 are present and four active elements 54 are arranged on the support part 60. These are preferably, even in the case of a number different than four, each distributed around the rotational axis 18 at equal angular distances from each other.

By means of the sensor device 48, a deflection position and/or a deflection direction of the tool unit 12 relative to the receiving unit 14 is determinable by the sensor elements 50 arranged on the printed circuit board 62 and the active elements 54 arranged on the flange portion 58. In particular, deflection position data regarding a deflection position and/or deflection direction data regarding a deflection direction of the tool unit 12 relative to the receiving unit 14 are providable by means of the sensor device 48.

A deflection state of the tool unit 12 relative to the receiving unit 14 is discretely or continuously determinable by means of the sensor device 48.

Further, by means of the sensor device 48, in particular by means of the active element 54 arranged on the shaft 26 and the sensor elements 50 arranged on the printed circuit board 62, a rotational speed of the rotor 20 relative to the stator 16 is determinable. In particular, rotational speed data regarding a rotational speed are providable by means of the sensor device 48.

The apparatus 10 preferably comprises a storage device 72 for storing a deflection state determined by the sensor device 48 and/or a rotational speed determined by the sensor device 48. The sensor device 48 preferably comprises the storage device 72. The storage device 72 is, in particular, arranged together with the sensor device 48 on the printed circuit board 62. The sensor device 48 is configured, in particular, as an integrated circuit.

The storage device 72 is configured to store deflection state data, in particular deflection position data and/or deflection direction data, and/or to store rotational speed data.

The storage device 72 is preferably configured to discretely or continuously store the deflection state data and/or the rotational speed data. A time interval for the discrete determination and/or storage is preferably predeterminable by an operator.

In particular, deflection states and/or rotational speeds determined by the sensor device 48 that exceed a predetermined threshold value and/or are below a predetermined threshold value are storable in the storage device 72. The threshold value is preferably also predeterminable by an operator. For this purpose, the storage device 72 comprises, in particular, a digital circular buffer. Incorrect operation of the compressed gas-operated apparatus 10 is thus preferably logable, wherein a use of the compressed gas-operated apparatus 10 can be monitored for guarantee purposes.

For this purpose, a time stamp for the respective sensor data is preferably storable in the storage device 72, such that a time profile of the sensor data can be logged. Alternatively or in addition thereto, a runtime, in particular a total runtime, of the compressed gas-operated apparatus is storable in the storage device 72, such that the runtime can be monitored, in particular for servicing.

The apparatus 10 comprises a data interface 74 for the data transmission of deflection state data and/or of rotational speed data. By means of the data interface 74, deflection state data regarding a deflection state of the tool unit 12 relative to the receiving unit 14 determined by the sensor device 48 are transmittable, for example to an indicating device 75.

The indicating device 75 may preferably be arranged in the receiving unit 14, for example in the covering part 68. The indicating device may comprise one or more light-emitting diodes (LED). The indicating device 75 is preferably arranged on the printed circuit board 62.

In order to make optical signals from the indicating unit 75 immediately visible to the operator, the compressed gas-operated apparatus 10 preferably comprises a translucent housing element 77, for example in the form of an acrylic glass element 79, in particular in the shape of a plate. The translucent housing element 77 is preferably arranged between the receiving unit 14 and the covering part 68 and can extend along the entire outer circumference of the receiving unit 14.

By means of the at least one light-emitting diode (LED), different deflection states of the tool unit 12 can be displayed on the apparatus 10 itself so as to be immediately recognizable to the operator. Colors are preferably used for this purpose, for example green (within a desired range), yellow (at the edge of the desired range), and red (outside the desired range).

Alternatively or in addition, acoustic indications can be made to the operator by the indicating device 75, an indicator tone sounding, for example upon exceeding a threshold value.

Further, e.g. rotational speed data regarding a rotational speed determined by the sensor device 48 are transmittable to the indicating device by the data interface 74. The data interface 74 is configured for wired and/or wireless transmission of data, and in particular is arranged on the printed circuit board 62.

The stator 16 of the tool unit 12 presently forms an air inlet for the compressed gas motor 24. Compressed gas, in particular compressed air, is suppliable to the air inlet by way of an inlet opening 76 by a compressed gas provisioning device not shown in FIGS. 1 to 3. By means of the compressed gas supplied to the stator 16 by way of the inlet opening 76, the rotor 20 can be set into rotation in the direction of the arrow 78 by way of the drive elements 32 arranged on the shaft 26.

For applying the pistons 36 guided in the receiving unit 14 with pressure, the apparatus 10 further comprises a compressed gas connector 80, by means of which the pistons 36 are configured to be applied with compressed gas, in particular compressed air, by the compressed gas provisioning device not depicted in FIGS. 1 to 3.

Figure 4:
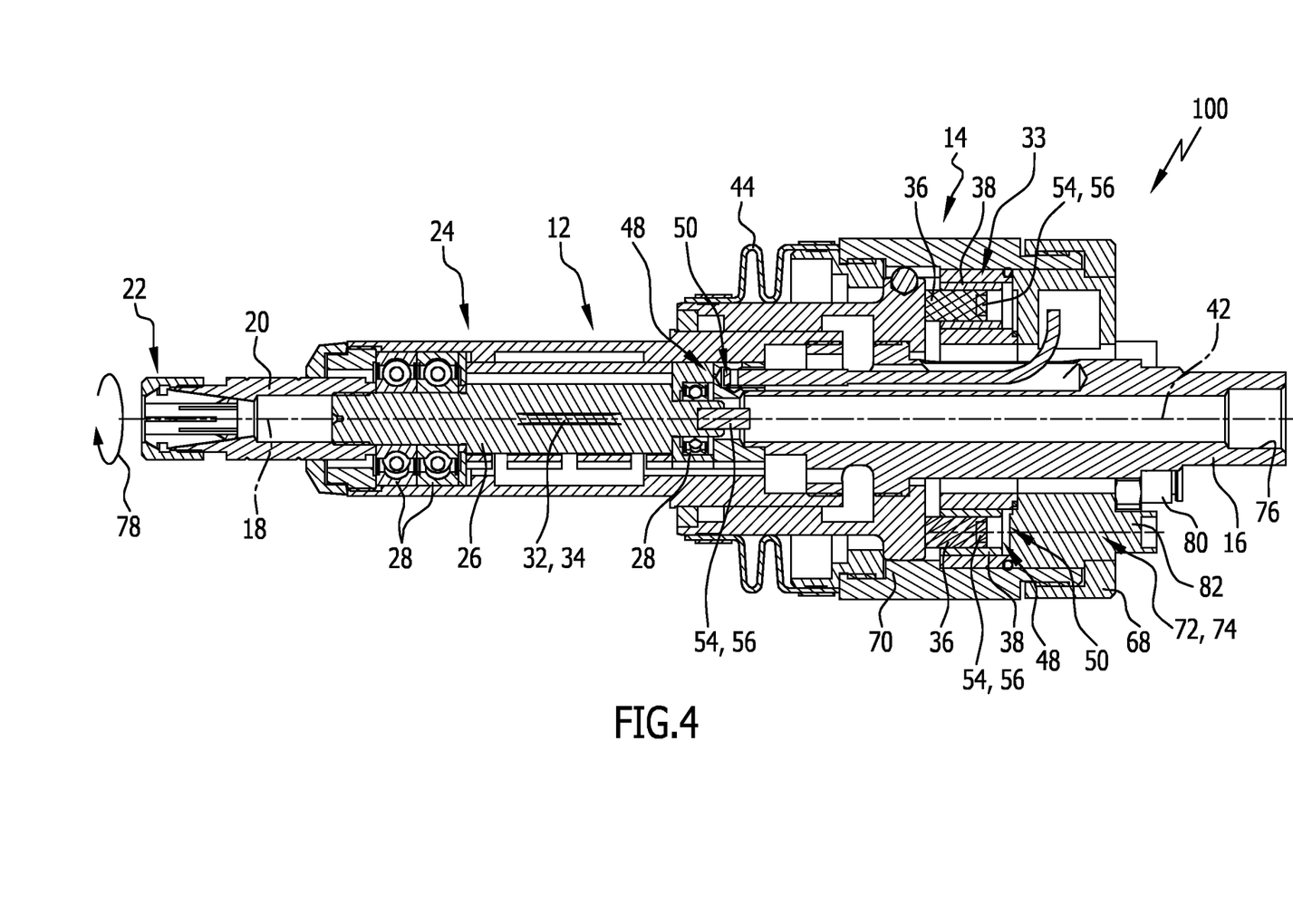
FIG. 4: shows a longitudinal sectional view of a further preferred embodiment of a compressed gas-operated apparatus in accordance with the invention in a starting position.

FIG. 4 shows a longitudinal sectional view a further advantageous embodiment, designated with the reference numeral 100, of a compressed gas-operated apparatus in accordance with the invention. Identical reference numerals are used for like or functionally equivalent features and components of the apparatuses 10 and 100. The advantages that can achieved with the apparatus 10 can also be achieved with the apparatus 100, such that reference may be made to the preceding remarks in this regard.

The difference between the apparatuses 10 and 100 is basically that the sensor device 48 of apparatus 100 comprises one or more sensor elements 50 for determining a position of the pistons 36 along the guide direction 40. By determining the position of the pistons 36, which are fixed to the tool unit 12, a deflection position and/or deflection direction of the tool unit 12 in relation to the receiving unit 14 can preferably be inferred.

For this purpose, the sensor device 48 comprises active elements 54 configured as permanent magnets 56. The active elements 54 are, in particular, arranged on a face side of the pistons 36 remote from the tool unit 12.

The compressed gas-operated apparatus 100 comprises a sensor unit 82, which is arrangable on, in particular screwable into, the receiving unit 14. The sensor unit 82 preferably comprises one or more sensor elements 50, by means of which a deflection of the pistons 36 is determinable. The sensor unit 82 preferably further comprises a storage device 72 and a data interface 74.

For determining a rotational speed of the rotor 20 relative to the stator 16, the sensor device 48 of the apparatus 100 comprises a further sensor element 50. The sensor element 50 is arranged, in particular, in relation to the rotational axis 18, radially next to the active element 54 configured as a permanent magnet 56, which is arranged on the end of the shaft 26 that is remote from the connecting portion 22.

In the compressed gas-operated apparatus 100, the sensor elements 50 of the sensor device 48 are arranged, in particular, in a region of the apparatus 100 that is applied with pressure.

Figure 5:
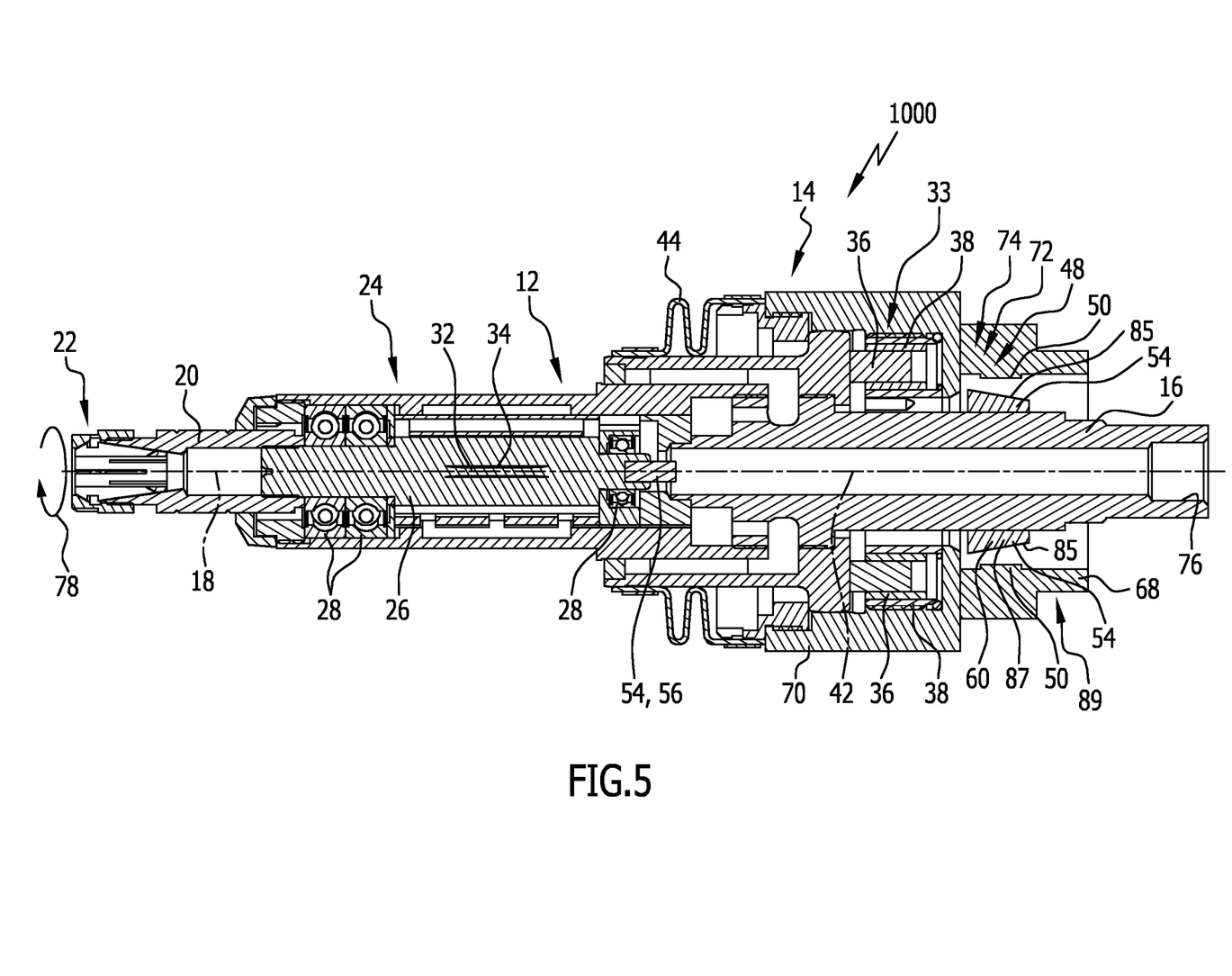
FIG. 5: shows a longitudinal sectional view of a further preferred embodiment of a compressed gas-operated apparatus in accordance with the invention in a starting position.

FIG. 5 shows a longitudinal sectional view of a further advantageous embodiment, designated with the reference numeral 1000, of a compressed gas-operated apparatus in accordance with the invention. Identical reference numerals are used for like or functionally equivalent features and components of the apparatuses 10, 100, and 1000. The advantages that can achieved with the apparatus 10, 100 can also be achieved with the apparatus 1000, such that reference may be made to the preceding remarks in this regard.

The difference between the apparatuses 10 and 1000 is substantially that the sensor device 48 of the apparatus 1000 comprises active elements 54, which are fixed to the stator 16 on a side remote from the rotor 20 and are configured e.g. as surfaces 85 arranged obliquely to the rotational axis 18, for determining a deflection state of the tool unit 12 relative to the receiving unit 14.

For this purpose, the sensor device 48 comprises, in particular, a ring 87, which is arranged on the stator 16 on a side remote from the receiving portion 22. The surfaces 85 are arranged on a circumference of the ring 87. The ring 87 preferably comprises four surfaces 85 arranged in uniform distribution about the circumference.

The sensor device 48 of the apparatus 1000 comprises one or more sensor elements 50, which are configured as inductive sensor elements. The sensor elements 50 are introduced, in particular, into the covering part 68 of the receiving unit 14. The covering part 68 thereby preferably comprises or forms a sensor unit 89. A distance from a respective surface 85 is favorably determinable with a respective sensor element 50, such that a deflection state of the tool unit 12 relative to the receiving unit can be inferred by way of the determined distance. The sensor device 48 comprises, in particular, the same number of surfaces 85.

A rotational speed of the rotor 20 in relation to the stator 16 can be determined in the apparatus 1000 by means of the sensor device 48 in a manner analogous to apparatus 100. For this purpose, the sensor device comprises, in particular, an active element 54 arranged on the shaft 26, which is configured, in particular, as a permanent magnet 56. The active element 54 is arranged on an end of the shaft 26 remote from the connecting portion 22.

In the embodiment of the compressed gas-operated apparatus 1000 depicted in FIG. 5, the sensor elements 50 are likewise arranged outside of a region of the apparatus 10 applied with pressure.

Figure 6:
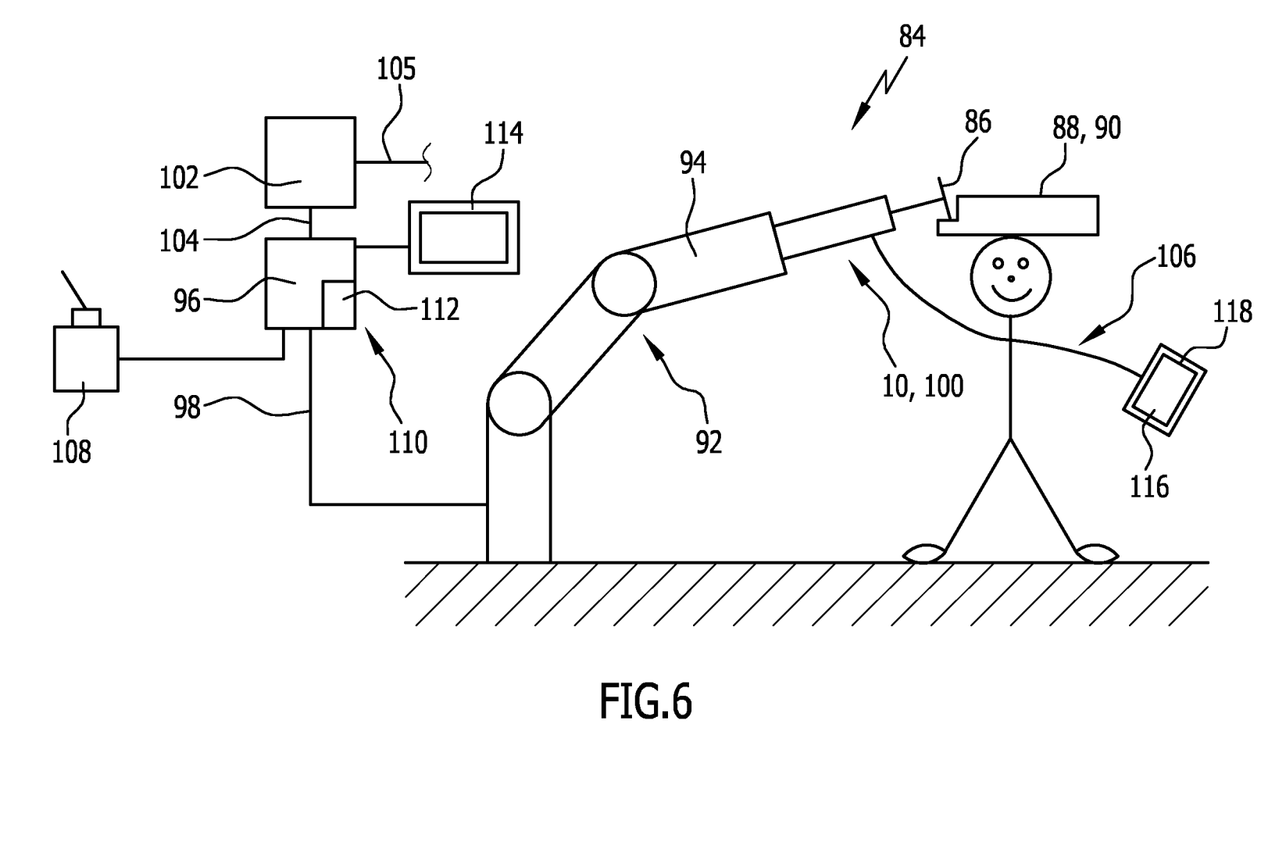
FIG. 6: shows a preferred embodiment of a compressed gas machining system in accordance with the invention, comprising a compressed gas-operated apparatus in accordance with the invention.

An example of an application of the compressed gas-operated apparatuses 10, 100, or 1000 is shown in the following with reference to FIG. 6, in which an advantageous embodiment of a compressed gas machining system in accordance with the invention, designated with the reference numeral 84, is schematically depicted.

The compressed gas machining system 84 comprises the compressed gas-operated apparatus 10, 100, 1000, at the connecting portion 22 of which a machining tool 86 is connected to the shaft 26. The compressed gas-operated apparatus 10, 100, or 1000 serves to machine an object 88, in particular a workpiece 90.

The compressed gas machining system 84 further comprises a holding device 92, which is mechanically driven and moveable. The holding device 92 is configured as a robotic arm 94 in the present case. The compressed gas machining system 84 also comprises a control device 96, which is coupled to the robotic arm 94 by way of a control line 98 or wirelessly.

The compressed gas machining system 84 further comprises a compressed gas provisioning device 102, which is coupled to the control device by way of a control line 104. A supply conduit 105 for compressed gas connects the compressed gas provisioning device 102 to the compressed gas-operated apparatus 10, 100, or 1000.

The holding device 92 is controllable in an automated manner by means of the control device 96 and/or is controllable by an operator 106, in particular by a so-called integrator. For the holding device 92 to be controlled by the operator 106 by way of the control device 96, the compressed gas machining system 84 comprises an operating unit 108, for example in the form of a joystick, by means of which the holding device 92 is movable along a region of the object 88 to be machined upon being "taught" by the operator 106. Alternatively thereto, the holding device 92 with the compressed gas-operated apparatus 10, 100, or 1000 arranged thereon as well as the machining tool 86 is moveable by the operator 106 in a hand-guided manner for the purpose of "teaching".

The compressed gas machining system 84 comprises, in addition or alternatively to the indicating device 75, an optical and/or acoustic indicating device 110. By means of said indicating device 110, it can be displayed when the deflection state of the tool unit 12 relative to the receiving unit 14 exceeds a predetermined threshold value and/or is below a predetermined threshold value, and/or by means of which indicating device 110 it can be displayed when a rotational speed of the rotor 20 in relation to the stator 16 of the apparatus 10, 100, or 1000 is below a predetermined threshold value.

The indicating device 110 preferably comprises a display device 112 with one or more light-emitting diodes (LED), for example for outputting colored indications, as described above. The display device 112 is arranged e.g. on the control device 96. Alternatively or in addition thereto, the indicating device 110 comprises a screen 114, for example of a personal computer (PC) or a screen 116 of a tablet computer 118, which is operable by the operator 106.

An operating software of the compressed gas-operating system 84 preferably comprises a plurality of different authorization levels, different authorization levels being assignable to different operators 106. In particular, different functionalities of the operating software can be enabled for an operator 106 in dependence on an assigned authorization level.

Different operating states of the compressed gas-operated apparatus 10, 100, or 1000 can be outputted to the operator 106 by the indicating device 110. When "teaching", different colors may serve to represent the operating states, for example by means of light-emitting diodes arranged on the display device 112.

The light-emitting diodes may e.g. be illuminated green when the compressed gas-operated apparatus 10, 100, or 1000 is operating in a desired range, i.e. when the tool unit 12 is deflected within a desired range in relation to the receiving unit 14. A yellow color can indicate to an operator 106 that the tool unit 12 is deflected up to the edge of a desired range in relation to the receiving unit 14 of the apparatus 10, 100, or 1000, wherein a red color can indicate e.g. that the tool unit 12 is deflected beyond a desired range in relation to the receiving unit 14 of the apparatus 10, 100, or 1000.

It can thus be prevented when "teaching" that the compressed gas-operated apparatus 10, 100, or 1000 is too greatly deflected and thus destroyed.

When "teaching" in an automated manner, e.g. on the basis of CAD data of a workpiece 90, the holding device 92, in particular the robotic arm 94, can preferably be moved in an automated and relatively quick manner along the workpiece 90. When the compressed gas-operated apparatus 10, 100, or 1000, in particular a machining tool 86 arranged thereon, is pressed against the workpiece 90, for example a deflection of the tool unit 12 relative to the receiving unit 14 is determined and/or checked by means of the sensor device 48.

A deflection determined during the automated "teaching" is preferably storable for later series production, such that a movement of the holding device 92 is controllable and/or regulatable on the basis of the positioning of the apparatus 10, 100, or 1000 and deflection of the tool unit 12 determined during the automated "teaching".

The holding device 92 is controllable by means of the control device 96 in dependence on the deflection state determined by the sensor device 48 of the compressed gas-operated apparatus 10, 100, or 1000. In an automated operation, faulty objects 88 or workpieces 90 as well as worn machining tools 86 can thus be detected and a faulty operation can be avoided.

The compressed gas-operated apparatus 10, 100, or 1000 can favorably be used as an, in particular, three-dimensional measuring device, for example for monitoring a position and/or a state of a workpiece 90 and/or for monitoring a position of the compressed gas-operated apparatus 10, 100, or 1000. When the compressed gas-operated apparatus 10, 100, or 1000 is moved along a workpiece 90 by means of the holding device 92, in particular by means of the robotic arm 94, a faulty workpiece 90, an incorrectly positioned workpiece 90, and/or a faulty position of the compressed gas-operated apparatus 10, 100, or 1000 can be inferred on the basis of a determined deflection of the tool unit 12 relative to the receiving unit 14 being too little or too great.

REFERENCE NUMERAL LIST 10 apparatus
12 tool unit
14 receiving unit
16 stator
18 rotational axis
20 rotor
22 connecting portion
24 compressed gas motor
26 shaft
28 bearing elements
30 drive space
32 drive element
33 restoring device
34 vane
36 piston
38 guide sleeve
40 guide direction
42 longitudinal axis
44 bellows
46 angle
48 sensor device
50 sensor element
52 3D Hall sensor element
54 active element
56 permanent magnet
58 flange portion
60 common support part
62 printed circuit board
64 carrier board
68 covering part
70 base part
72 storage device
74 data interface
76 indicating device
76 inlet opening
77 translucent housing element
78 arrow
79 Plexiglas element
80 compressed gas connector
82 sensor unit
84 compressed gas machining system
85 surface
86 machining tool
87 ring
88 object
89 sensor unit
90 workpiece
92 holding device
94 robotic arm
96 control device
98 control line
100 apparatus
102 compressed gas provisioning device
104 control line
105 supply conduit
106 operator
108 operating unit
110 indicating device
112 display device
114 monitor
116 monitor
118 tablet computer
1000 apparatus

The invention claimed is:

1. A compressed gas-operated apparatus comprising a tool unit and a receiving unit for accommodating the tool unit, the tool unit comprising a stator and a rotor that is rotatingly drivable about a rotational axis relative to the stator while being applied with compressed gas, the tool unit being deflectable relative to the receiving unit from a starting position that is predeterminable by means of the receiving unit into one or more deflection positions, wherein the apparatus comprises a sensor device for determining a deflection state of the tool unit relative to the receiving unit, wherein a deflection position and a deflection direction of the tool unit relative to the receiving unit is determinable by means of the sensor device, wherein a rotational speed of the rotor relative to the stator is determinable by means of the sensor device, and wherein the apparatus comprises a storage device for storing at least one of a deflection state determined by the sensor device and a rotational speed determined by the sensor device.

2. The apparatus in accordance with claim 1, wherein the apparatus comprises one or more pistons, which are guided in the receiving unit so as to be moveable along a guide direction and are configured to be applied with compressed gas.

3. The apparatus in accordance with claim 1, wherein the sensor device comprises one or more sensor elements and one or more active elements for determining at least one of the deflection position and the deflection direction of the tool unit, wherein the one or more active elements or the one or more sensor elements being arranged on a side of the tool unit remote from the rotor.

4. The apparatus in accordance with claim 3, wherein the one or more active elements are arranged on the side of the tool unit remote from the rotor and the one or more sensor elements are arranged on the receiving unit, or vice versa.

5. The apparatus in accordance with claim 3, wherein at least one of the sensor elements and the active elements are each arranged on a common support part.

6. The apparatus in accordance with claim 1, wherein sensor elements of the sensor device are arranged on a circuit board (PCB).

7. The apparatus in accordance with claim 2, wherein the sensor device comprises one or more sensor elements for determining a position of one or more pistons, for determining at least one of a deflection position and a deflection direction of the tool unit relative to the receiving unit.

8. The apparatus in accordance with claim 1, wherein a deflection state of the tool unit relative to the receiving unit is discretely or continuously determinable by means of the sensor device.

9. The apparatus in accordance with claim 1, wherein at least one of deflection states and rotational speeds determined by the sensor device that exceed a predetermined threshold value or are below a predetermined threshold value are storable by means of the storage device.

10. The apparatus in accordance with claim 1, wherein the apparatus comprises a data interface for the data transmission to an indicating device of deflection state data of a deflection state of the tool unit relative to the receiving unit determined by the sensor device.

11. The apparatus in accordance with claim 1, wherein the tool unit is deflectable from the starting position into the one or more deflection positions counter to a force of a restoring device.

12. The apparatus in accordance with claim 11, wherein the apparatus comprises one or more pistons, which are guided in the receiving unit so as to be moveable along a guide direction and are configured to be applied with compressed gas, and wherein the tool unit is moveable into the starting position by applying the one or more pistons with compressed gas.

13. The apparatus in accordance with claim 1, wherein the tool unit in the starting position is arranged coaxially to a longitudinal axis of the receiving unit.

14. The apparatus in accordance with claim 1, wherein, in one or more deflection positions, the tool unit is at least one of tilted relative to a longitudinal axis of the receiving unit and displaced relative to the receiving unit axially in the direction of the longitudinal axis of the receiving unit.

15. The apparatus in accordance with claim 14, wherein the tool unit is moveable in a shape of a conical surface, in at least one plane for tilting the tool unit relative to the longitudinal axis of the receiving unit.

16. The apparatus in accordance with claim 1, wherein the sensor device is configured as at least one of an inductive, capacitive, optical, and magnetic sensor device.

17. The apparatus in accordance with claim 1, wherein the sensor device comprises a Hall sensor element.

18. A compressed gas machining system, comprising a compressed gas-operated apparatus and a holding device being at least one of moveably configured and controlled, the apparatus comprising a tool unit and a receiving unit for accommodating the tool unit and being held on the holding device by way of the receiving unit, wherein the tool unit comprises a stator and a rotor that is rotatingly drivable about a rotational axis relative to the stator while being applied with compressed gas, wherein the tool unit is deflectable relative to the receiving unit from a starting position that is predeterminable by means of the receiving unit into one or more deflection positions, and wherein the apparatus comprises a sensor device for determining a deflection state of the tool unit relative to the receiving unit, wherein a deflection position and a deflection direction of the tool unit relative to the receiving unit is determinable by means of the sensor device, wherein a rotational speed of the rotor relative to the stator is determinable by means of the sensor device, and wherein the apparatus comprises a storage device for storing at least one of a deflection state determined by the sensor device and a rotational speed determined by the sensor device.

19. The compressed gas machining system in accordance with claim 18, wherein the compressed gas machining system comprises a control device adapted to at least one of control the holding device in an automated manner and control the holding device by an operator.

20. The compressed gas machining system in accordance with claim 18, wherein the holding device is controllable in dependence on the deflection state determined by the sensor device of the compressed gas-operated apparatus.

21. The compressed gas machining system in accordance with claim 19, wherein the compressed gas machining system comprises at least one of an optical and an acoustic indicating device operable to indicate to an operator when at least one of the deflection state and a rotational speed of the rotor relative to the stator exceeds a predetermined threshold value or is below a predetermined threshold value.

22. The compressed gas machining system in accordance with claim 19, wherein the compressed gas machining system comprises a compressed gas provisioning device that is coupled to the sensor device of the apparatus, by means of which at least one of the amount and the pressure of compressed gas is settable in dependence on a rotational state determined by means of the sensor device.

* * * * *